April 10, 1945.　　　　F. F. PEASE　　　　2,373,593
METHOD AND APPARATUS FOR TRANSFORMING SUBSTANTIALLY NON
FORM RETAINING MASSES INTO SOLID CAKES OR BARS
Filed Nov. 29, 1941　　　　10 Sheets-Sheet 1
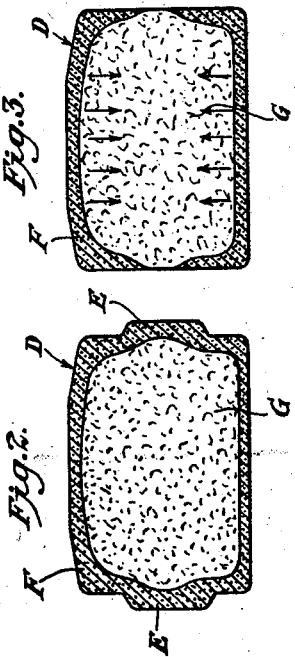
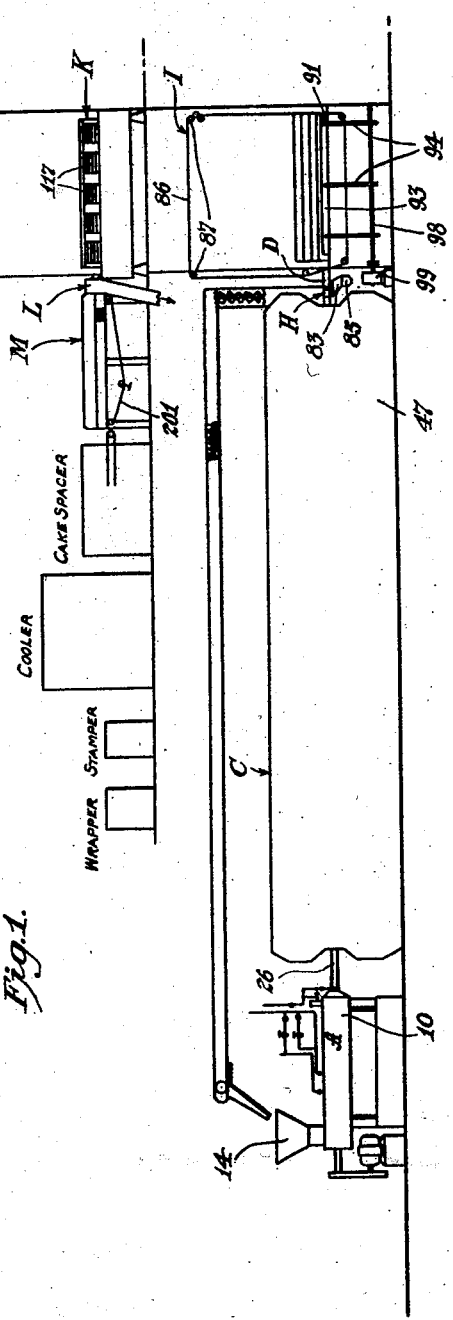
INVENTOR
FRED FORREST PEASE
BY
ATTORNEYS April 10, 1945.   F. F. PEASE   2,373,593
METHOD AND APPARATUS FOR TRANSFORMING SUBSTANTIALLY NON
FORM RETAINING MASSES INTO SOLID CAKES OR BARS
Filed Nov. 29, 1941   10 Sheets-Sheet 2
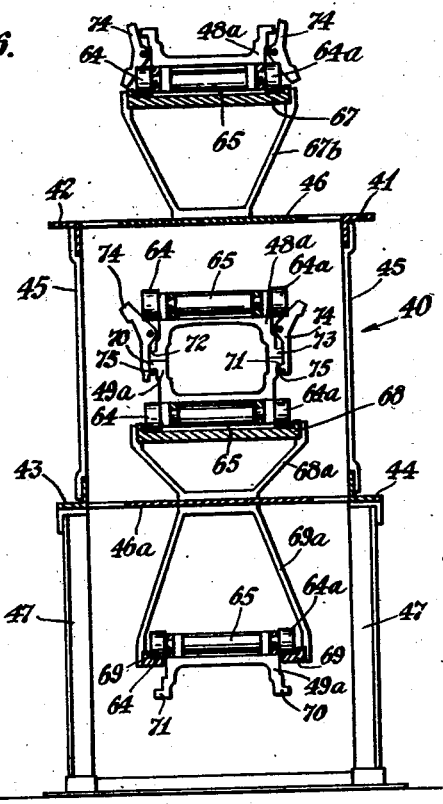
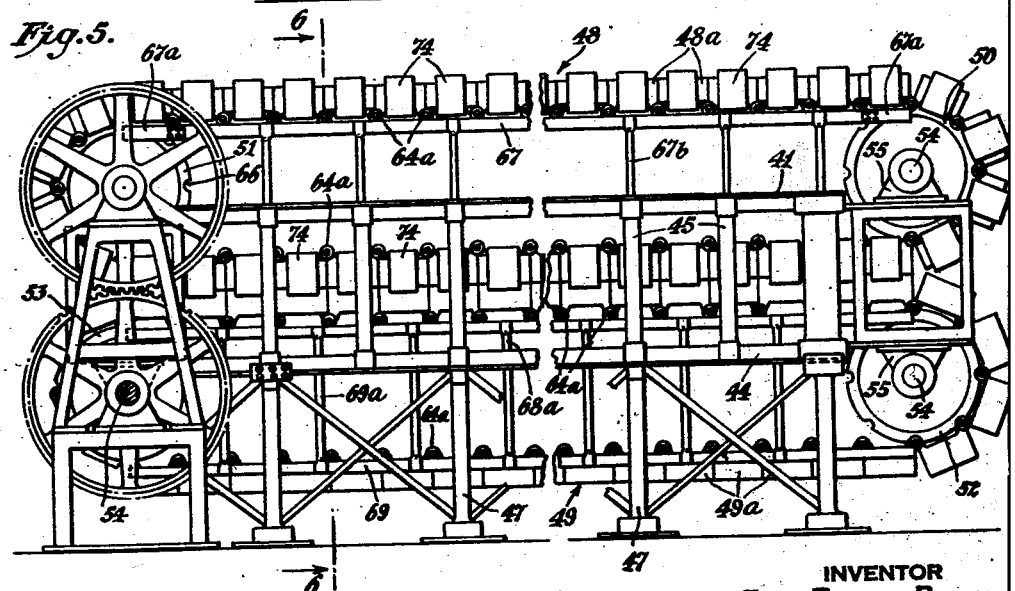
INVENTOR
FRED FORREST PEASE
BY
ATTORNEY April 10, 1945. F. F. PEASE 2,373,593
METHOD AND APPARATUS FOR TRANSFORMING SUBSTANTIALLY NON
FORM RETAINING MASSES INTO SOLID CAKES OR BARS
Filed Nov. 29, 1941 10 Sheets-Sheet 3

INVENTOR
*Fred Forrest Pease*
BY
*Hoguet, Neary & Campbell*
ATTORNEYS

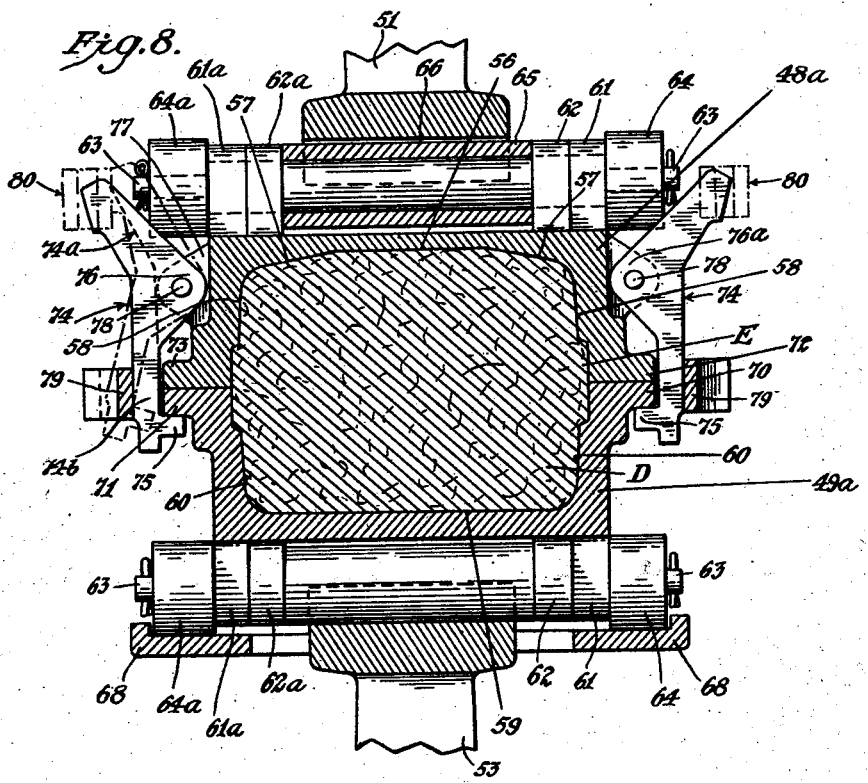
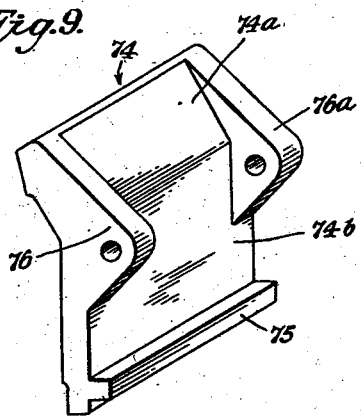
INVENTOR
FRED FORREST PEASE
BY
ATTORNEYS

April 10, 1945. F. F. PEASE 2,373,593
METHOD AND APPARATUS FOR TRANSFORMING SUBSTANTIALLY NON
FORM RETAINING MASSES INTO SOLID CAKES OR BARS
Filed Nov. 29, 1941 10 Sheets-Sheet 5
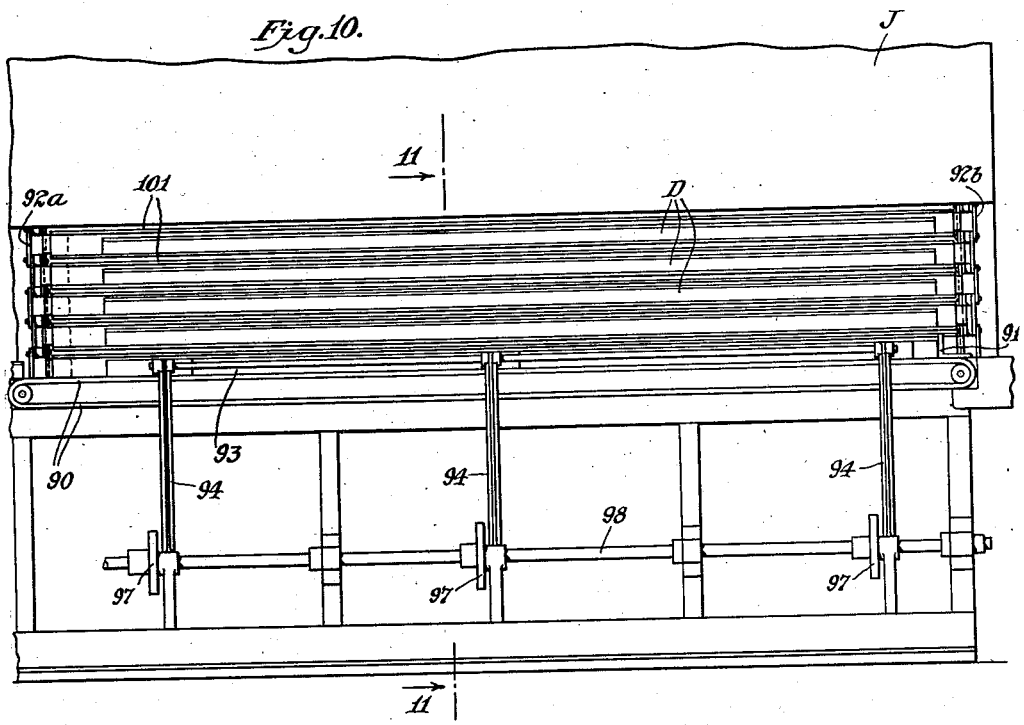
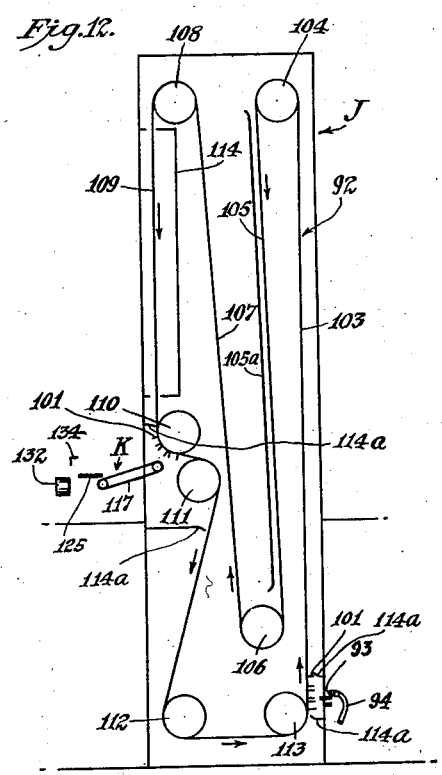
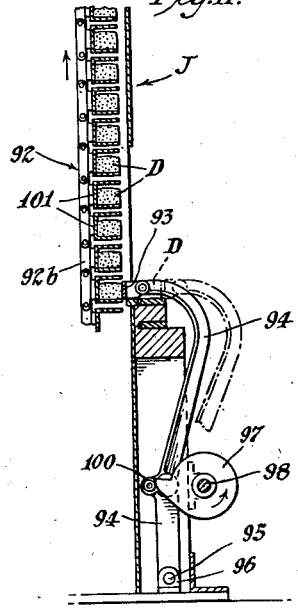
INVENTOR
FRED FORREST PEASE
BY
ATTORNEYS April 10, 1945.                F. F. PEASE                 2,373,593
      METHOD AND APPARATUS FOR TRANSFORMING SUBSTANTIALLY NON
          FORM RETAINING MASSES INTO SOLID CAKES OR BARS
                    Filed Nov. 29, 1941        10 Sheets-Sheet 7
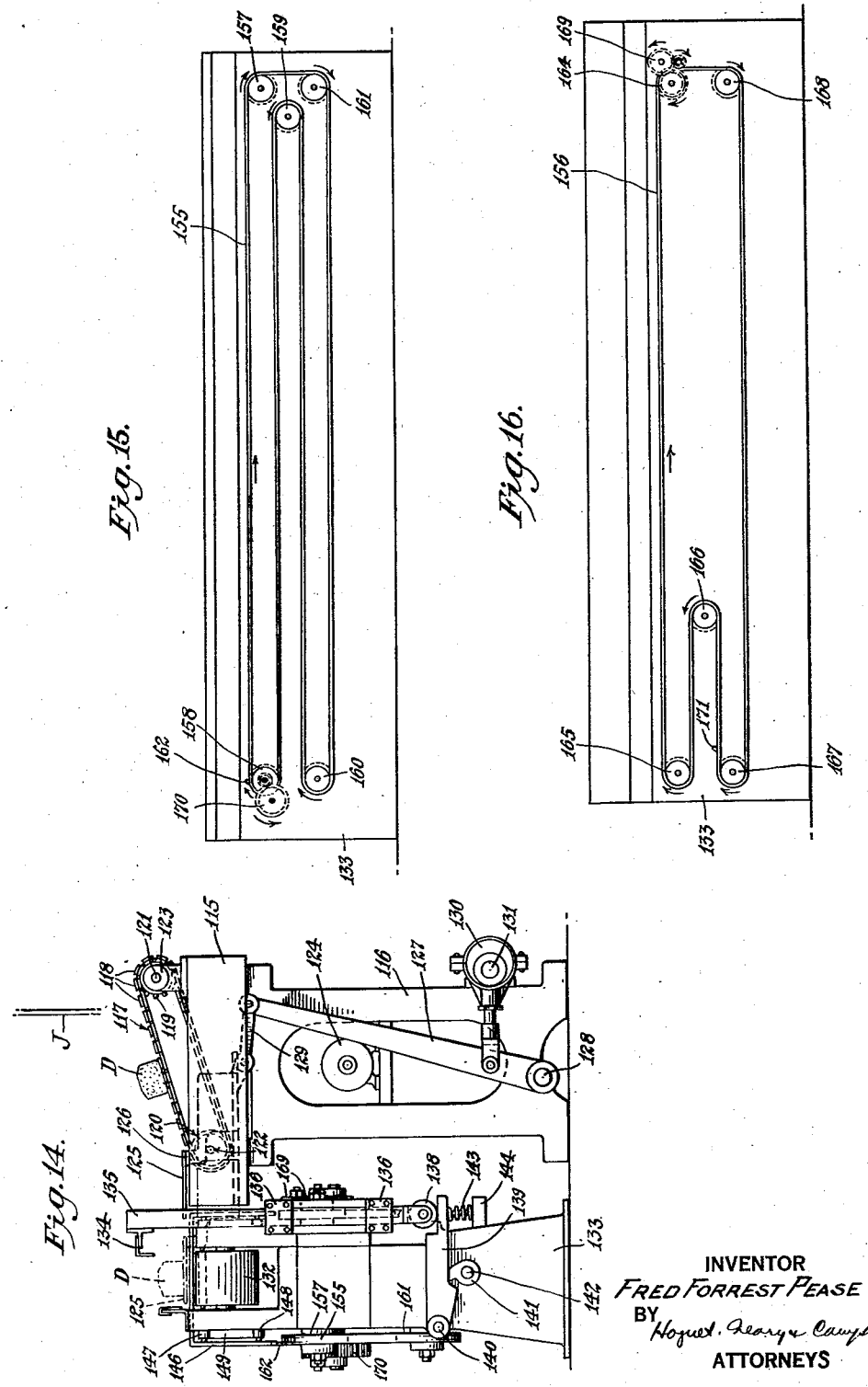
INVENTOR
FRED FORREST PEASE
BY
ATTORNEYS

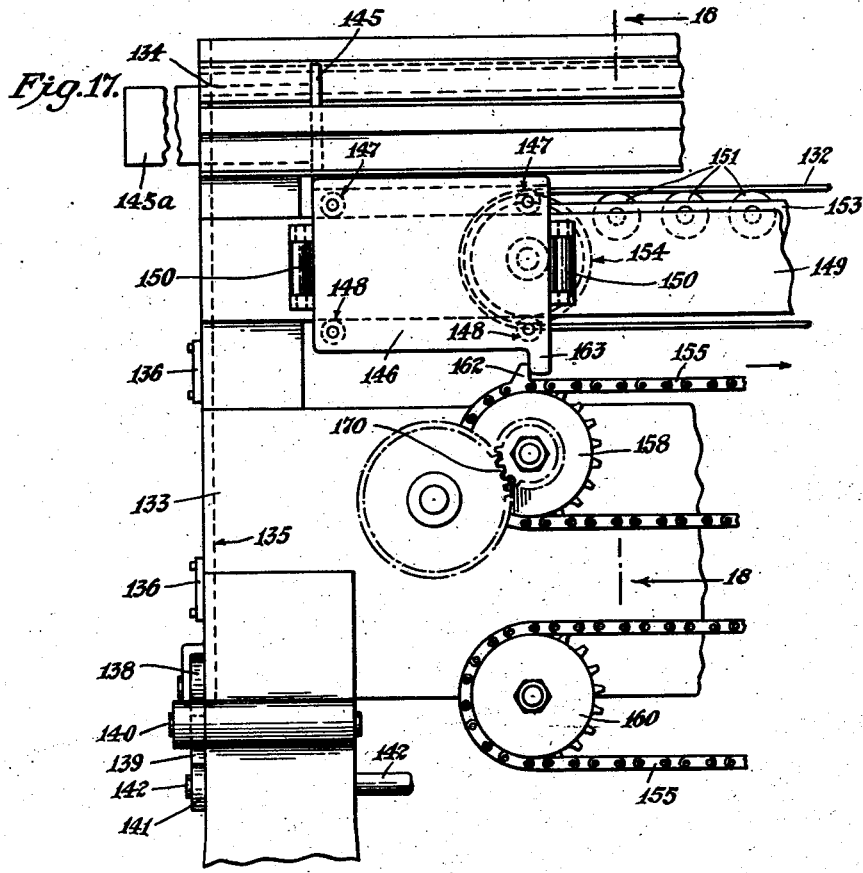
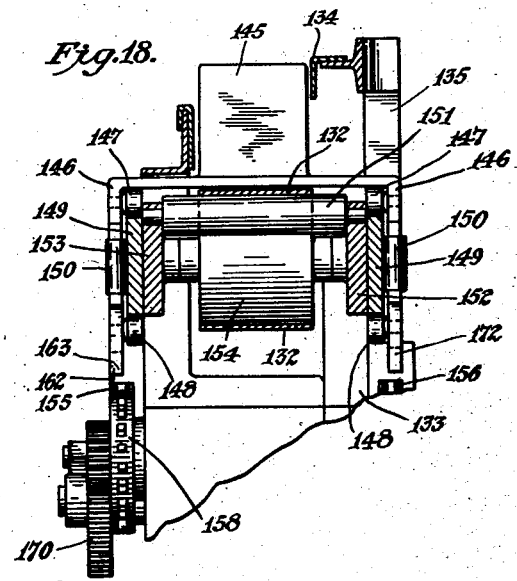

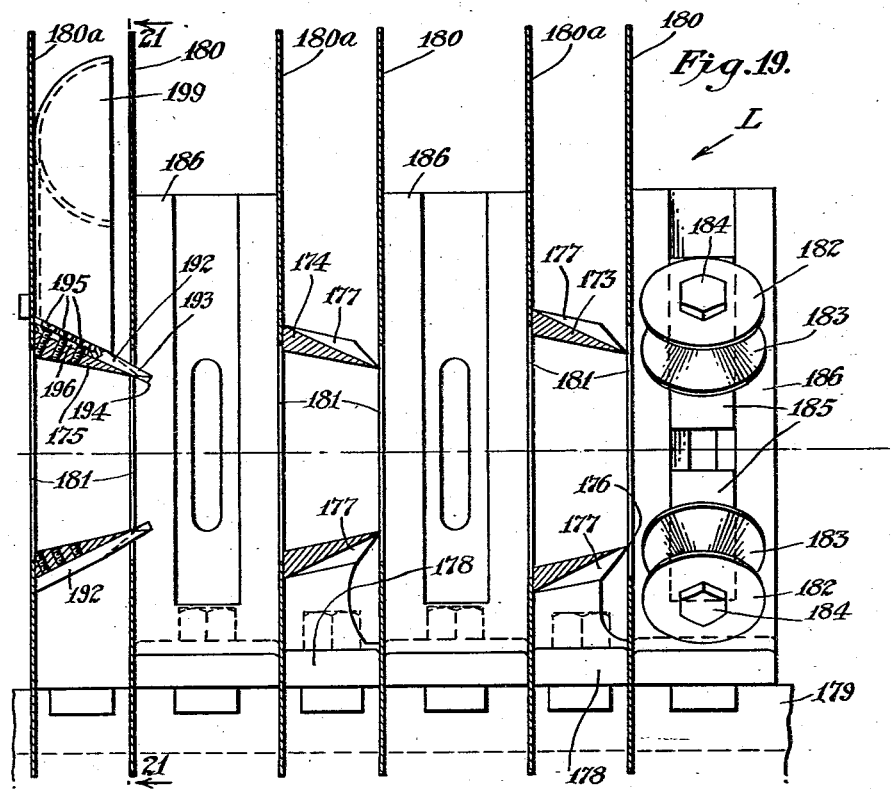
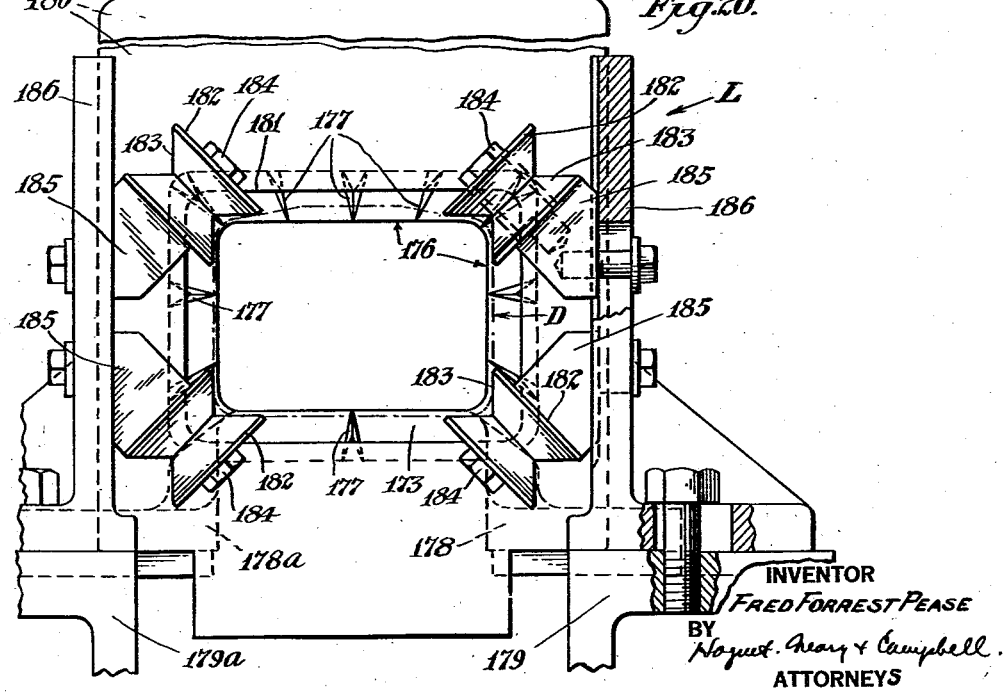
Fig. 19.
Fig. 20.

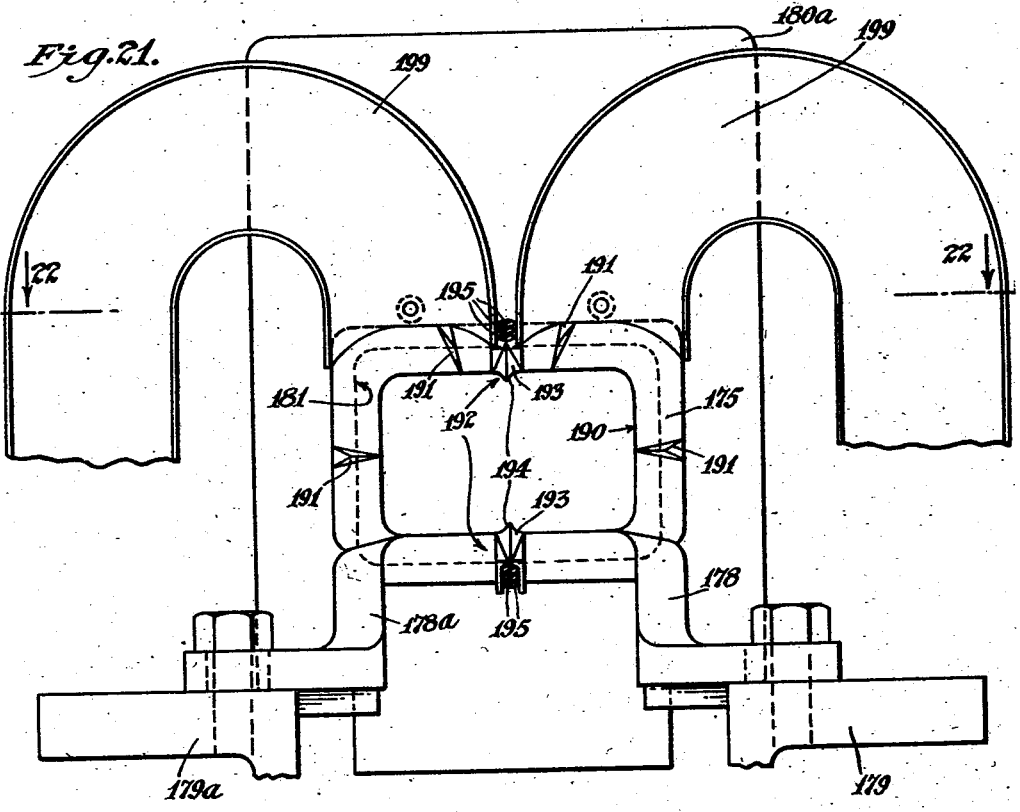
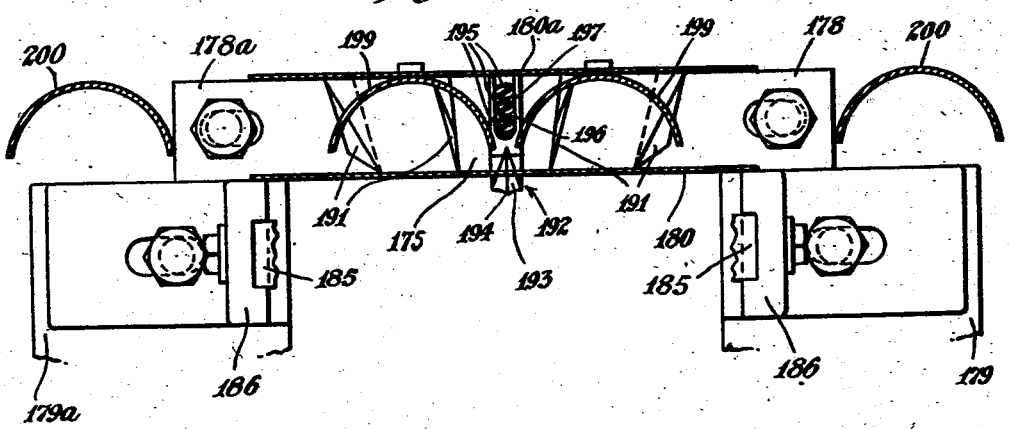

Patented Apr. 10, 1945

2,373,593

UNITED STATES PATENT OFFICE 2,373,593

METHOD AND APPARATUS FOR TRANSFORMING SUBSTANTIALLY NON-FORM-RETAINING MASSES INTO SOLID CAKES OR BARS

Fred Forrest Pease, Squantum, Mass., assignor to Lever Brothers Company, Cambridge, Mass., a corporation of Maine Application November 29, 1941, Serial No. 421,046

14 Claims. (Cl. 18—58)

The present invention relates to methods and apparatus for transforming substantially non-form-retaining masses into solid cakes or bars of predetermined shape and form, and relates more particularly to methods and apparatuses for the continuous production of soap in cake form. This may involve, by way of example, the continuous conversion of a stream of hot aerated soap, of low moisture content, into a bar or rod of such shape as to compensate for subsequent shrinkage upon cooling and the passage of such a bar through the various cooling, treating and shaping stages to obtain with a minimum amount of wastage a final cake product having a uniform texture and density.

The invention in a preferred form also will produce cakes of soap having a homogeneous and uniform physical structure and density, and a smooth even surface. Such soap cakes will be free from undesirable imperfections or variations in the surfaces and interiors thereof.

The novel methods and apparatuses disclosed hereinafter may be used in the treatment of semi-fluid, fluid or plastic masses which harden upon cooling, such as are disclosed in the United States patents to Bodman No. 2,215,539, dated September 24, 1940, and Pease No. 2,048,286, dated July 21, 1936. They are particularly applicable to the continuous and economical reduction of an aerated fluid, semi-fluid or plastic soap mass to a solid bar or cake form.

For the purpose of illustrating the invention, it is described herein as applicable to the treatment of an aerated hot soap mass released from an apparatus of the type disclosed in the Pease Patent No. 2,048,286. The preferred process includes the steps of discharging continuously a mass of hot aerated plastic soap into a cooling zone under pressure while maintaining it in a substantially static condition until it becomes substantially form retaining.

It is known that upon cooling, a soap mass, particularly an aerated soap mass, will shrink. If the soap mass, for example, is in a long bar form of rectangular cross-section, the normal shrinkage of the soap mass occurring during cooling would cause the sides of the bar to cave in, forming concave surfaces. Such a concave-sided bar would require excessive trimming to produce one with flat sides and a rectangular cross-section so that it could be cut into the conventional cake form.

In order to regulate or compensate for shrinkage of the first formed bar upon cooling in accordance with the present invention, the bar is first formed with side ribs extending along its length. Inasmuch as soap has low heat conductivity, only a relatively thin outer zone solidifies during the initial cooling of the bar. The inner zone, being as yet little cooled, remains plastic and substantially unchanged from its condition when discharged. The solidified outer zone is of substantially uniform thickness and follows the contour of the outer surface. The ribs formed along the length of the bar are subsequently trimmed off, and as a result of there being less thickness of hardened or solidified soap along the trimmed portions, the trimming of the ribs tends to form weakened side walls on the bar. Shrinkage takes place principally in these weakened zones extending longitudinally of the bar thereby permitting the top and bottom surfaces to remain parallel as the soap mass shrinks upon further cooling. As a result, it is found that there is less caving in of the top and bottom surfaces of the bar and the bar retains substantially its initial shape.

After removal of the ribs, the continuous bar of soap in the process illustrated is severed into lengths and subjected to further cooling to hasten the solidification of the interior of the bar. This is followed by a tempering treatment to permit the hardened surfaces of the bars to soften slightly to facilitate cutting after which the bar lengths are trimmed to approximately final size and separated into cakes. These cakes may then be stamped and wrapped. All of these operations take place continuously and a high rate of production with a high degree of uniformity in the physical characteristics of the resulting soap cakes is maintained.

The apparatus involved in preparing the soap products in accordance with the illustrative process has been constructed so that each element thereof cooperates with the other elements to produce a final product of predetermined characteristics. These elements of the apparatus are so related as to conform to the desired sequence of operations with the soap in such physical condition that it may be treated without distortion or excessive strain on the soap mass or the apparatus and with a minimum amount of waste or rejects because of non-uniformity of the product.

The preferred apparatus includes a device for delivering a hot mass of soap into a device which forms the issuing mass of soap into a continuous bar while chilling the bar to a self-sustaining condition by means of a cooling medium circulating in heat-exchange relationship with the bar-forming apparatus. The bar former illustrated is a chain mold type of device and permits the bar to be shaped while in a substantially static condition with a minimum of turbulence or flow of the soap mass upon transfer to the bar former. In this way the presence of the undesirable "flow lines" within the mass are eliminated.

After the soap has been formed into a self-sustaining form it is delivered from the bar-former to an apparatus which includes mechanism for trimming and weakening the side walls of the continuous bar of soap in order to minimize uneven collapse of a surface, mechanism for cutting the continuous bar into lengths suitable for further processing and mechanism for continuously conditioning the bar lengths to render them substantially uniform throughout and in a condition to permit subsequent trimming. These bars are then delivered to a device which trims the excess material from the bar lengths to give them a cross sectional shape corresponding closely to the cross-sectional shape of the cake of soap finally to be produced. This final trimming of excess material may also be utilized to eliminate any surface "flow lines" present. The shaped bar is then cut into cakes, spaced and cooled further and subjected to the usual stamping or embossing and wrapping operations.

The process of the present invention may be practiced in any suitable apparatus of the type described.

For a better understanding of the present invention, reference may be had to the accompanying drawings in which:

Figure 1 is a diagrammatic sketch illustrating a typical plant layout embodying the present invention;

Figures 2, 3 and 4 are views in vertical section and at various stages of preparation and treatment of a typical bar of soap in accordance with the present invention;

Figure 5 is a view in side elevation of the bar-forming device shown with the casing removed and partly broken away;

Figure 6 is a view in section taken on line 6—6 of Figure 5;

Figure 8 is an enlarged view taken on line 8—8 of Figure 7;

Figure 9 is a perspective view of one of the latches for the bar forming device;

Figure 10 is a front elevation of a portion of the bar-conditioning device, disclosing details of the construction of the mechanism for loading the bar conditioning device;

Figure 11 is a view in section taken on line 11—11 of Figure 10;

Figure 12 is a diagrammatic showing on a reduced scale of the conveying system of the bar-conditioning device;

Figure 14 is a view in elevation of the device disclosed in Figure 13;

Figures 15 and 16 are opposite side views of chain drives for feeding the bar through the trimming device looking in the directions of the arrows 15A and 16A of Figure 13;

Figure 17 is a view in side elevation of a portion of the feed device disclosing details of the pusher and its supporting carriage;

Figure 18 is a view in section taken on line 18—18 of Figure 17;

Figure 19 is a view in vertical section of a device for trimming the bar to a cross-section corresponding substantially to the cross-section of a finished cake of soap;

Figure 20 is a view in front elevation of the trimming device disclosed in Figure 19;

Figure 21 is a view in section taken on line 21—21 of Figure 19.

Figure 22 is a view in section taken on line 22—22 of Figure 21.

Figure 7:
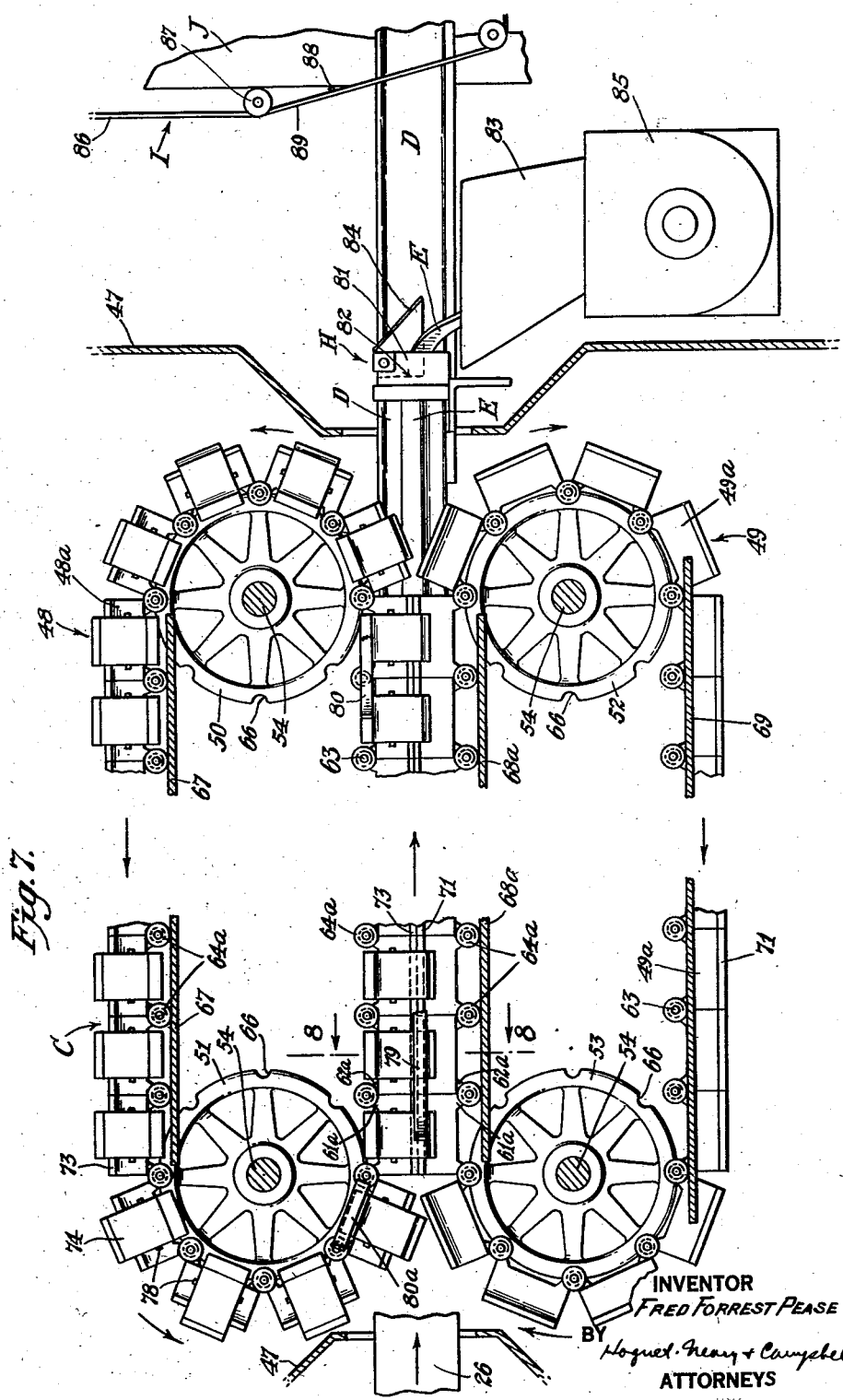
Figure 7 is a side view of a chain molding device for forming a soap mass into a continuous bar, said device being shown partly broken away and with the housing and the supporting framework therefor broken away to disclose details thereof.

As shown in Figure 1, an illustrative plant and method for preparing soap cakes in accordance with the invention may include an apparatus A of the type disclosed in the Pease Patent No. 2,048,286 dated July 21, 1936, which comprises essentially a steam jacketed housing 10 having a pair of closely interfitting spiral elements therein which work a mass of soap and aerate it while in a plastic, semi-fluid or molten condition.

The present invention is applicable to the treatment of soap stocks which have been prepared according to any of the practices obtaining in the commercial manufacture of soap. Soap containing between about 5 and 25% of moisture and preferably in a granulated or chip form is fed to such apparatus evenly and continuously by the hopper 14. The solid soap is reduced therein to a continuous plastic or semi-fluid condition by the addition of heat and working and aeration. While it is preferred to feed the soap in solid form, the soap stock charged may be semi-solid, liquid or molten dependent upon its temperature. If a hot fluid soap mass is charged to the aerating or working apparatus, the mass may be subjected to cooling as is disclosed in the Pease patent, for example.

Other suitable or known types of proportioning, treating, and conveying apparatuses may be utilized in treating the soap mass to impart desired characteristics and in discharging the soap mass into the bar former, and soap stock made in accordance with any of the practices obtaining in the commercial manufacture of soap may likewise be used in such other devices so long as the moisture content and other characteristics are such that the soap will solidify upon cooling.

The soap mass in the illustrative example is preferably released from the apparatus A in a plastic or semi-fluid condition at a constant rate and is delivered at a constant pressure into a bar-forming device C which shapes the mass as a result of surface solidification continuously into a bar form. The device C includes a chain-mold which is encased in an insulating housing. A temperature of about 20° F. is maintained in the bar-forming device C by the diffusion of cold air therethrough so that the surface of the bar is made less plastic and becomes form-retaining. In some instances the soap in a molten, semi-solid or plastic condition may be fed directly to the bar-former C if no prior modifying treatment is contemplated. Delivery of the soap into the bar-forming device C converts it from a flowing mass into a static mass which moves through the first forming zone without movement relative to the bar former and is not removed from the bar former until an outer shell has solidified and it is substantially form-retaining. By reducing to a minimum any tendency for the soap to flow within the bar former, the tendency to form flow lines or strata within the mass is minimized. If any relative motion in the mass of soap occurs within the bar former, it is localized at the surface of the mass and the lines of flow formed may be removed by trimming operations later described herein.

As shown in Figure 2, the bar-forming device C imparts to the bar D a generally rectangular cross-sectional shape with somewhat convex sides and projecting ribs E extending longitudinally of the bar. When the bar D approaches the outlet end of the bar former C, in the illustrated operation, the cooling has hardened the surface zone to an extent indicated generally by the shell F, Figure 2. The interior G of the bar may be substantially unchanged and still be in a plastic condition.

As the bar D issues from the bar-former C it passes through a trimmer H which planes the ribs E from the bar, leaving the bar in the condition shown in Figure 3, that is, with weakened zones extending along the side walls. By forming a predetermined weakened zone along the bar in this way, any further contraction or shrinkage of the bar will take place generally in the direction of the arrows and will result in a shape upon solidification requiring a minimum of final trimming, as will be subsequently described.

The continuous bar of soap is then divided into lengths by means of a cutter I and these lengths delivered to a bar-conditioning device J. The lengths of soap bars move through the bar-conditioning device J where, as a result of cooling, they are made less plastic throughout. Just before issuing from the conditioner, the lengths are passed through a tempering zone where no further chilling takes place and where their overcooled and over-hardened surfaces are softened slightly by the residual heat in the bar to obtain a more uniform plasticity throughout the soap mass. This treatment facilitates subsequent trimming and cutting of the bars in final cake form for stamping.

The tempered or conditioned bars of soap are removed from the device J by a conveyor and feed system K and pushed endwise through a trimming device L where the bar is reduced to the cross-sectional shape disclosed in Figure 4, thereby removing any imperfections in the surfaces of the bar produced by the preceding operations and also trimming away any portions of the bar having flow lines or striations therein. After passing through the trimming device L, the bar is delivered to a cake cutter M which severs the bar into a plurality of cakes in a known manner.

These cakes may be further cooled, stamped or embossed with the desired design or indicia and wrapped and packaged.

The cake cutting, spacing, cooling, embossing and wrapping devices per se do not form a part of the present invention and any device for performing these operations on the soap may be used.

The other devices described above, however, cooperate in a novel manner in the operations of shaping and controlling the size of the bar and are in themselves novel constructions.

In order to more adequately disclose the structures of these devices, they will be described hereinafter in detail in the order of their use in the treatment of the soap mass.

When the soap issues from a device A of the illustrative type disclosed in the Pease patent in which the soap mass is worked and aerated, it passes through a conduit 26 into the bar-former C. During passage through the device A, the soap is subjected to violent agitation which forms a homogeneous mass of the soap. As the mass enters the bar-former C, relative movement of the soap and the confining chamber ceases with the result that the soap becomes static immediately.

As shown particularly in Figures 1, 5, 6, 7, 8 and 9, the illustrative bar-former C consists of a chain molding device which is enclosed in an insulated housing 47 and is cooled by a suitable refrigerating device. The chain molding device includes a supporting framework 40 formed of four elongated angle irons 41, 42, 43 and 44 which are joined by rigid uprights 45, upper horizontal plates 46 and lower horizontal plates 46a into a rigid box girder construction. The framework 40 is supported upon a plurality of pairs of legs 47 in spaced relation to the floor. Inasmuch as the framework is subjected to widely varying temperatures, for example room temperature, when not in operation, and about 20° F., when the device is in use, provision is made for contraction and expansion of the frame. As viewed in Fig. 5, the left-hand end of the framework 40 is firmly anchored to the legs 47 adjacent thereto while the remainder of the framework 40 is supported on, but free to move relatively to the other pairs of legs 47.

The chain molding device includes two sets of cooperating molding chains 48 and 49 which are supported at their opposite ends on sprockets 50 and 51, and 52 and 53, respectively. These sprockets are mounted on shafts 54 which are supported in adjustable pillow blocks 55 at the ends of the frames 40. The shafts 54 at the left-hand end of the device are intergeared and one of these shafts is driven by a motor (not shown).

As shown particularly in Figure 8, each link of the upper chain 48 consists of a generally U-shaped member 48a. This member may have a variety of shapes internally which are suitable for the purposes of this invention. As illustrated, the inside surface has a flat central bottom portion 56, inclined lateral bottom portions 57 and stepped vertically disposed side wall portions 58.

Each link 49a of the bottom chain 49 is also U-shaped in cross-section and may also be of a variety of shapes internally for the purposes as described. As illustrated, it has a substantially flat bottom portion 59 and stepped side wall portions 60. The chain mold sections 48a and 49a define a cavity for molding a bar of soap D of generally rectangular cross-section having a convex upper surface, a flat bottom, and side walls having outwardly directed ribs E, as shown in Figure 2.

At the ends of each chain-mold section 48a and 49a there are a pair of lugs 61 and 61a which can be aligned with lugs 62 and 62a on the next adjacent mold section. The lugs 61 and 61a and 62 and 62a in each instance are carried by a shaft 63 for pivotal movement. The shaft 63 also carries the rollers 64 and 64a at its ends. A cylindrical sleeve 65 is mounted on the shaft 63 between the lugs 62 and 62a for engagement in the notches 66 in the sprockets 50 and 51 or 52 and 53. The shaft 63 thus connects the links or mold sections of the chain mold and permits relative rocking movement between each mold section as it passes around the sprocket wheel.

The rollers of the upper flight or pass of the mold chain 48 rest upon guide rails formed by a channel member 67 (Fig. 7) having angle irons 67a projecting from its opposite ends extending longitudinally of the machine and which are supported by U-shaped brackets 67b secured to the top of the plates 46.

A similar guide 68 (Figs. 7 and 8) engages the rollers 64 and 64a on the upper flight of the lower chain 49 in its passage from left to right. The guide 68 is supported on U-shaped brackets 68a secured to the upper surfaces of the plates 46a. The lower flight of the chain 49 is supported by guide rails 69 which engage beneath the rolls 64 and 64a and suspend the mold sections with their concave sides opening downwardly. The guide rails 69 are supported by U-shaped uprights 69a fastened to the under surfaces of the plates 46a.

As shown in Figure 8, each of the upper mold sections 48a is provided with outwardly projecting flanges 72 and 73 which engage flatly against the flanges 70 and 71, respectively, of each of the lower chain-mold sections 49a.

In order to avoid the necessity of providing means for forcing the mold sections together to prevent leakage of the soap therefrom with attendant increase in friction and power required to drive the chains, a latching mechanism, disclosed particularly in Figures 8 and 9, is provided for clamping the mold sections together. Referring to Figure 9, each of the latches 74 consists of a plate having two angularly related sections 74a and 74b. Adjacent the outermost edge of the section 74b is a flange 75 which is adapted to engage beneath either the flange 70 or the flange 71 on the lower mold section. The latch 74 is provided with a pair of spaced lugs 76 and 76a which straddle a single lug 77 on each side of the upper mold section 48a. These lugs are connected by a pin 78 on which the latches may rock relatively to the mold section. When the flange 75 is engaged beneath the flange 70 and the flange 71 of the lower mold section, the upper and the lower mold sections are locked together as shown in Figure 8.

The latches 74 are forced into and retained in latching position by means of a cam rail 79 extending along each side of the machine so as to rock the latches into latching engagement as soon as the mold sections 48a and 49a come into contact at the left hand end of the machine and retain them in that position until shortly before they reach the right hand end of the machine. The latches are released by means of a cam rail 80 on each side of the chains which engages the opposite end of the latch and rocks it to the dotted line position shown in Figure 8. This permits the chain-mold sections to separate and release the soap mass which continues forward and issues from the housing 47 with its surface solidified sufficiently to hold its molded shape. Another pair of cams 80a are mounted at the front end of the device to engage the ends 74a of the latches and retain them in open position as the mold sections 48a and 49a move together so that the weight of the latches cannot cause them to swing into engagement with the flanges 70 and 71 and to jam or break the latches and/or mold sections.

As the bar of soap D having a hardened surface zone of substantially uniform thickness and the ribs E thereon issues from the bar-former C, it passes through the trimmer H (Figs. 1 and 7) which as illustrated may consist of a rectangular frame 81 fixed to the housing 47 in which a pair of knives 82 are supported in such relation as to plane off the ribs E, leaving the side walls of the bar substantially flat as shown in Figure 3. The shavings are deflected downwardly into a hopper 83 by means of the inclined deflecting plates 84 on the rear ends of the knives 82. From the hopper these trimmings are returned by a suitable screw conveyor system 85 to the feed hopper 14 of the agitating and aerating device A.

The bar D then travels to the bar cutting device I (Figs. 1 and 7) which acts to cut the continuous bar in lengths suitable for the conditioner J. The illustrative cutter consists of a pair of parallel chains 86 suitably supported on opposite sides of the bar D by spaced apart sprockets 87 on the exterior of the conditioning device J subsequently illustrated. The cutting element for severing the bar into sections consists of a wire 88 extending between the two chains so that it will be drawn through the soap bar by the chains. These chains are driven continuously at a rate proportional to the speed of movement of the bar of soap D so as to complete a cycle of movement in the length of time required for the bar to advance a predetermined distance, for example 7 feet. The downward flight of the chains 86 includes an inclined portion 89, the inclination of which is related to the speed of movement of the bar and the speed of the chains 86. Inasmuch as the cutting wire 88 upon passing through the soap bar advances with the bar, the ends of each section of the bar will be severed at right angles to the axis of the bar.

The severed lengths of soap bars are pushed forward by the end of the advancing continuous bar, on to a conveyor belt 90. This belt moves at such a rate that the severed lengths are carried rapidly away from the advancing end of the continuous bar at the conclusion of the cutting operation. The movement of the bar length is stopped by the abutment 91. At that time an elongated plate-like pusher member 93 pushes the bar length laterally on to a supporting unit of a conveyor 92 which carries the bar length through the conditioner J. The pusher member 93 is pivotally mounted upon the uppermost ends of three curved arms 94. The arms 94 pivot at their lower ends upon a shaft 95 journaled at 96 near the base of the device J. Movement of the arms 94 and the pusher 93 between solid and dotted line positions shown in Figure 11 is caused by three cams 97 carried on the shaft 98. These cams are driven by means of a motor 99, shown in Fig. 1. The cams 97 engage cam-follower rollers 100 supported upon the arms 94. The pusher moves forward and back and acts to advance a bar length of soap D into the conveyor as soon as the bar length is in alignment with the soap receiving means on the conveyor. The motor 99 through suitable connections may also drive the chains 86 and the belt conveyor 90 and the conveyor 92 in the bar-conditioning device. Its operation is synchronized with the mechanisms giving the bar-forming device C a suitable movement.

The means for receiving the bars of soap on the conveyor 92 consists of a series of elongated channel members 101 which are connected to the links of a pair of chains 92a and 92b at each end of the channel members. The chains 92a and 92b as best shown in Figure 12, move upwardly in a vertical flight 103 over sprockets 104, downwardly in an inclined flight 105 beneath the sprockets 106, upwardly in a slightly inclined flight 107, over the sprockets 108 and vertically downwardly in the flight 109. The soap bars D may be retained in the channels 101 in the inclined flight 105 by means of rails 105a in engagement with the bars D. The channel members 101 then pass beneath sprockets 110 which invert them and discharge the soap bars D. The empty channel members then pass over the sprockets 111, downwardly beneath the sprockets 112 and 113 and upwardly to receive again bar lengths of soap. The channels 101 receive the bars loosely and when the channels change direction from up to down the bars are moved from one side to the other side of the channels thereby exposing all sides of the bars to cooling. The complete cycle of treatment normally will require about three hours, although this time may be varied considerably depending upon the cross-sectional area of the soap.

During the passage of the soap bars through flights 103, 105 and 107 the soap is subjected to cooling air at a temperature of about 40° F. in order to more completely and rapidly solidify the bars. This chilling operation overcools the surfaces of the bars and makes the surfaces too hard to be handled efficiently in subsequent operations. Accordingly, in the flight 109 the bars are passed between the outer wall of the tower and a partition 114 where entrance of the chilled air is prevented. This zone at about room temperature permits the residual heat in the bar to warm the surfaces of the bar and thereby tends to equalize the consistency of the bar. The bar-conditioner may be provided with suitable air locks 114a adjacent the inlet and outlets of the tower to prevent escape of the refrigerated air. The air locks 114a may include resilient flaps which rub against the edges of the channel members 101 and thus at least partially seal the chamber from the warmer outside air.

As the bars of soap are discharged from the conveyor 92 they are received upon the bar unloading device K as shown in Figure 1. The function of the bar unloading device is to receive the bars of soap from the conveyor 92, align the bars in parallel relationship, change their direction of movement, and provide a means for accummulating and feeding the bars to the trimmer L in timed relation to the operation of such other apparatus as, for example, the cake cutter M. The details of the illustrated bar unloader K are disclosed more particularly in Figures 13 and 14. This device, as shown in Figure 14, includes a horizontal rectangular framework 115 supported by a pair of standards 116 at opposite ends thereof. Between the ends of the rectangular framework 115 are a plurality of conveyor elements 117 made up of slats 118 joined together pivotally to form an endless conveyor. The several conveyors 117 are supported upon suitable sprockets 119 and 120 which are mounted upon the shafts 121 and 122 at the rear and front of the rectangular frame 115, respectively. As shown particularly in Figure 14, the shaft 121 is supported by means of the journals 123 which extend above the upper surface of the rectangular framework 115 while the shaft 122 is disposed within the framework 115, thereby causing the conveyors 117 to slant downwardly away from the bar-conditioner J. The shaft 122 is driven by a motor 124 in a counterclockwise direction, in order to move the bars slowly from right to left as viewed in Fig. 14.

An intermittent feed device is disposed at the lower ends of the conveyors 117. This device includes transfer plate 125 which is reciprocated horizontally to pick up a bar length of soap D from the conveyors 117 and transfer it to a feeding device. The feeding device in turn advances the bar of soap through the trimming device L. The transfer plate 125 has downwardly projecting guide members 126 at opposite ends thereof which are slidably mounted in guideways in the side elements of the rectangular frame 115.

Reciprocating movement is imparted to the transfer plate 125 by means of a pair of levers 127 at opposite ends of the frame 115. The levers 127 are pivotally supported at their lower ends 128. The upper end of each lever 127 is connected to the corresponding slide 126 by means of a link 129.

Oscillating movement is imparted to the levers 127 by means of eccentrics and pitmans 130 which convert the rotary movement of a shaft 131 into reciprocating movement. The shaft 131 is driven in timed relationship to the conveyor 117 by means of the motor 124.

With this construction, the conveyors 117 are adapted to receive one or more of the bar lengths D from the conditioner J and deliver them to the transfer plate 125 in parallel relationship. It has been found that the bars of soap do not fall evenly from the conveyor 92; sometimes one end falls first while the other end sticks momentarily to the conveyor 92. Thus the bars may slant across the conveyors 117. However, when the bars engage the transfer plate 125 the conveyor 117 swings the lagging ends of the bars around and deposits the bars on the transfer plate 125 in parallel relationship to the edges of the plate 125. During operation a plurality of bars of soap may accumulate on the conveyor 117, and thus the conveyor 117 acts as a reservoir to compensate for variation in the timing of the transfer plate 125 and the rate of delivery of the bars from the conditioner J.

The soap bars D are transferred from the transfer plate 125 to the conveyor belt 132 which is supported in the framework 133.

The means for removing the soap bar D from the transfer plate 125 and transfering it to the conveyor belt 132 includes an abutment or holding member 134 which comes down behind the bar length D after it is carried forward over the conveyor belt 132, permitting the transfer plate to be withdrawn from under the bar length. Upon removal of the supporting plate 125 the bar length drops on to the conveyor belt 132. More specifically, this apparatus consists of the angle-iron abutment member 134 attached to the movable supports 135 placed at the ends of the transfer plate 125. The supports 135 are slidably mounted for vertical reciprocation in guide members 136 at opposite ends of the frame 133. The lower end of each support 135 is split and carries a roller 138. The roller 138 operates against a lever 139 which has its opposite end pivotally supported at 140 on the frame 133. Oscillatory movement is imparted to the lever 139 by a cam member 141 to raise and lower it and also the abutment member 134. This cam is fixed to a shaft 142 extending longitudinally of the frame 133 and is driven by the motor 124. A shock absorbing spring 143 is supported on a lug 144 projecting from the frame 133 beneath the lever 139 to engage and buffer the downward movement of the lever 139 as the cam 141 rotates.

The conveyor belt 132 is connected to the carriage 146 and acts to support and convey the soap bar D into the trimming device L.

The means for advancing the soap bar is best shown in Figures 17 and 18 and consists of a pusher plate 145 which projects upwardly from the forward end of an inverted U-shaped carriage 146. The plate 145 is provided with a plunger 145a extending parallel to the belt 132. The U-shaped carriage 146 is provided with an upper pair of rollers 147 and a lower pair of rollers 148 extending inwardly from each side of the carriage 146. These rollers rest or bear against the upper and lower edges of the guide plates 149 which extend longitudinally of the frame 133 on each side thereof. Each side member of the carriage 146 is also provided with a pair of rolls 150 which bear against the flat sides of the guide plates 149 and further prevent chattering or wobbling of the carriage 146.

In order to prevent the conveyor belt 132 from sagging, its upper flight is supported by means of a plurality of rollers 151 extending between the longitudinally extending side members 152 and 153 of the frame 133. The opposite ends of the conveyor pass over supporting rolls 154 similarly mounted between the side members 152 and 153.

Referring now to Figures 15 and 16, motion is imparted to the pusher member 145 and its supporting carriage 146 by means of chains 155 and 156 on opposite sides of the frame 133. The chain 155 includes four horizontal flights which are obtained by passing the chain over the sprockets 157 and 158 which support the top pass or flight, the sprocket 159 for supporting the two middle flights and the sprockets 160 and 161 for supporting the lowermost flight. The chain 155 is provided with a lug 162 which, as shown in Figure 17, is adapted to engage a lug 163 projecting downwardly from the left hand side of the carriage 146, as viewed in Figure 18.

Figure 13:
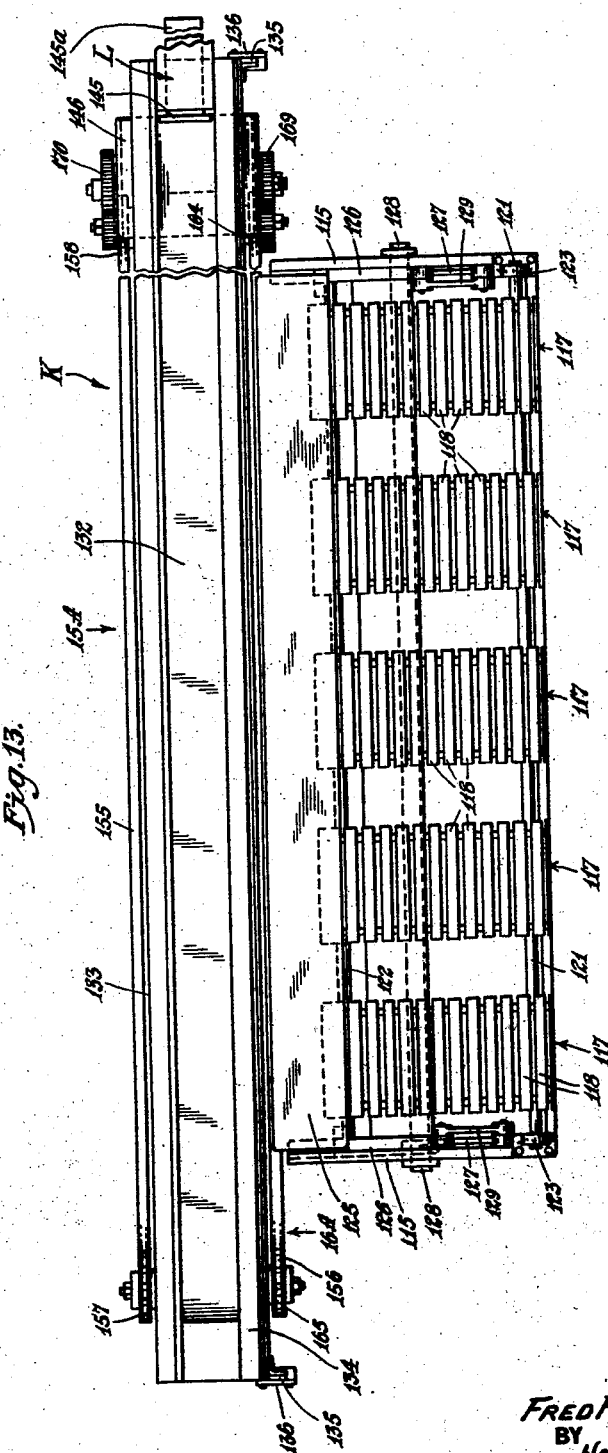
Figure 13 is a plan view of a mechanism for unloading the bars of soap from the bar conditioning device and an associated feed mechanism for advancing a bar of soap through a device for trimming the bar.

Thus, during one cycle of movement of the chain, the lugs 162 and 163 engage and the carriage 146 is moved from the right hand end of the frame, as viewed in Figure 13, to the left hand end of the frame at which point the lugs 162 and 163 disengage.

Movement in the opposite direction to advance the bar of soap D through the trimming member L is imparted by means of chain 156 which is suitably supported on the opposite side of the frame 133. The chain 156 is supported by five sprockets 164, 165, 166, 167 and 168 which provide a long upper flight, a long lower flight and two intermediate flights of lesser length than the corresponding flights of the chain 155. Therefore, the chain 156 is of lesser length than the chain 155.

The function of this construction is to provide a feed which will advance the bar of soap D slowly through the trimming member L (Figure 1), and return the carriage 146 at a higher rate of speed. In order to do this the chains 155 and 156 are driven in opposite directions at such a rate that they will complete their cycles in equal amounts of time. Thus, the chain 156 is driven through a reduction gearing 169 of greater speed reduction than the reduction gear 170 which drives the chain 155, both of these reduction gearings being driven by the motor 124.

The chain 156 is provided with a lug 171 which will engage a lug 172 projecting downwardly from the carriage 146 at its right hand side, as viewed in Figure 18. Thus upon actuation of the chains the pusher member 145 is advanced slowly by the lug 171, pushing the bar of soap D on the conveyor 132 from left to right, as viewed in Figure 13, and then is retracted by the lug 162 on the chain 155 at a higher rate of speed so that it will be adjacent the left hand end of the conveyor 132 when the next bar of soap D is transferred to the conveyor 132 by the transfer member 125.

The bar trimmer L is used to reduce the bars of soap D to substantially the desired dimension of the face of the cakes of soap to be produced and to trim away the surface portions of the soap which may contain flow lines or striations. In order to provide smooth, polished surfaces on the bars to avoid the necessity of further treating the edges of the soap cakes to be produced and to assure the bar having proper cross-sectional dimensions, the trimmer preferably is provided with sharp edged rigid knives that cut away the excess material. Other trimming devices, such as tensioned wires or the like, tend to impart a rippled surface to the bar and to vary the cross-sectional shape of the bar. The trimmer as illustrated consists essentially of three rectangular trimming sharp edged knives 173, 174 and 175. The size of these knives is related to the size of the bar as it is delivered from the bar-conditioner J so that a minimum amount of the bar is trimmed away to produce the desired area. The knife 173 therefore is somewhat smaller than the size of the bar as formed initially. The trimming knives 173 and 174 are substantially identical in construction with the exception that the knife 174 is slightly smaller in its dimensions than the knife 173 so as to further reduce the cross-sectional area of the bar after it has passed through the knife 173. The use of a plurality of knives, each removing a thin shaving from the bar, has the advantages of minimizing the power required to push the bar through the trimmer, or reducing the tendency of the bar to buckle and prevent chipping or otherwise marring the surface of the trimmed bar.

The knife 173, as best shown in Figure 20, is of hollow truncated pyramidal form having its narrower end sharpened to form a cutting edge 176 defining an opening of the shape of a rectangle having rounded ends so as to plane a shaving of soap from each of the four sides of the bar of soap D. Around the outer periphery of the knife 173 are a plurality of splitting blades 177 which have cutting edges disposed in planes substantially at right angles to the outer surfaces of the knife 173. The blades 177 serve to split the material shaved from the surface of soap bar D into a plurality of narrower shavings and to deflect them outwardly away from the bar. The knife 173 is supported upon legs 178 and 178a which extend down and out from the lower corners of the knives and are fixed to suitable spaced apart supporting base members 179 and 179a which may be secured to the end of the frame 133. The knife 174 is similar to the knife 173 and the knives 174 and 175 are similarly mounted on the base 179 and 179a.

Each of the knives 173, 174 and 175 is mounted between a pair of deflecting plates 180 and 180a, each having an aperture 181 therein sufficiently large to permit the bar of soap to pass through it. The apertures are of successively smaller cross-sectional area corresponding to the decrease in the area of the soap bar as it passes through the knives.

The plates 180 and 180a serve to deflect the soap shavings outwardly away from the bar to a chute by means of which the shavings may be returned to the agitating and aerating apparatus A.

The bar is guided into the knives 173, 174 and 175 by means of four rollers 182, each of these rollers being disposed adjacent the corners of the knife 173. The rollers 182 preferably are formed of relatively soft rubber so as to support the bar resiliently and are provided with V-shaped portions 183 spanning the corners of the bar and engaging the side portions adjacent to the corners. The rollers 182 are rotatably mounted on stud bolts 184 positioned in the adjustable blocks 185 at angles of 45° with respect to the supporting vertical uprights 186 on each side of the knife 173. The axes of rollers 182 are at right angles to each other. Both uprights 186 are fixed, with capacity for adjustment, to the supporting plates 179 and 179a.

While only one set of four rollers 182 is disclosed in the drawings, it will be understood that similar rollers may be mounted between knives 173 and 174 and 174 and 175, if desired.

The knife 175, as shown in Figures 19 and 21, is of a frusto-pyramidal shape having a leading generally rectangular cutting edge 190 and is provided with a plurality of splitting knives 191 projecting from its outer surface. In addition, the knife 175 is provided with a pair of knife elements 192 for cutting a groove in each side of the soap bar. The knives 192, as shown in cross-section in Figure 19, are gouge-like elements having a concave upper surface 193 and a pointed leading end 194 which gouges out a curved wall groove in the center of the upper and lower surfaces of the bar of soap (Figure 4). The knives 192 are adjustable on the exterior surface of the knife 175 to take a deeper or shallower cut by means of a plurality of locking screws 195 which pass through a slot 196 in the rear end of the blade 192 and overlie inwardly projecting flanges 197 which define the slot 196 in the blade.

When the bar of soap is advanced by the plunger 145a on the pusher member 145, the forward end of the bar is received between the rollers 182 and engages the cutting edge of the knife 173. As the bar of soap is pushed through the knife 173 shavings are planed from the surfaces of the bar, these shavings being split into narrower shavings by the knives 177 and deflected outwardly by the plates 180 and 180a to fall into the chute for return to the agitating and aerating device A. The bar then engages the knife 174 which takes another cut from each of the walls of the soap bar, this shaving being split and deflected and the bar then comes into engagement with the knife 175 which planes a further shaving from the surface of the bar and also grooves the upper and lower surfaces thereof by means of the knives 192.

It will be understood that more or less than three illustrative trimming blades may be used if desired, so long as the cutting operation is sufficient to produce the desired cross-sectional shape without roughening or chipping the sides of the bar.

The shavings from each of the knives, if desired, may be deflected by an arrangement of the type disclosed in Figures 21 and 22. The deflecting plate 180a for the knife 175 may be provided with oppositely directed arcuate channel members 199 which receive the shavings and deflect them outwardly and downwardly into the chute.

The trimmed bar upon passage through the trimmer L is received upon a driven conveyor 201 of the cake cutting device M which aids in drawing the rear end of the bar through the trimming device L. The plunger 145a is of sufficient length to push the bar completely through the trimmer L.

The bar then may be severed into cakes by means of any desired type of cake cutting apparatus and may be further treated as by subjecting them to a further cooling operation, stamping, and wrapping in the usual way.

The operations previously discussed are conducted in a continuous manner and in timed relationship either by means of synchronous motors or by a common gearing system, so that the bar from the time it is initially formed is subjected to a controlled cooling, cutting and shaping operation to produce a final product having predetermined shape, size and a substantially uniform texture throughout.

While the preferred form of apparatus has been disclosed herein and an apparatus is provided which functions effectively, it will be understood that variations may be made in the details of the apparatus and their relative dispositions.

The cooling conditions in the bar forming device and the conditioning tower may be varied suitably depending upon the type, condition and amount of the soap to be treated and final shape and size of the cake to be produced. Therefore, the above described embodiments of the apparatus and of the method for practicing the invention may be varied considerably without departing from the invention and they should be considered as illustrative only and not as limiting the scope of the following claims.

I claim:

1. A method for preparing soap in cake form which comprises simultaneously cooling heated soap and forming it into a bar of substantially rectangular cross-section having a surface less plastic than its center portion, weakening a side wall of said bar, cutting the bar into sections of predetermined length and cooling said sections, whereby said weakened wall permits a controlled movement of said wall as a result of shrinkage of the bar during cooling.

2. A method for preparing a soap in cake form which comprises delivering a heated plastic mass of soap under pressure, simultaneously cooling and continuously forming said soap into a continuous substantially self-supporting bar having a substantially rectangular cross-section and a hardened surface zone, weakening a side walls of said bar to facilitate movement of said wall, cooling said bar and thereafter allowing the residual heat of the bar to soften its surface zones, to produce a bar having a substantially uniform plasticity throughout and a substantially rectangular cross-sectional shape.

3. A method for preparing soap in cake form which comprises delivering a heated plastic mass of soap, simultaneously cooling and forming said soap into a bar of substantially rectangular cross-section having a hardened surface zone, weakening the side walls of said bar, cutting the bar into sections of predetermined length and cooling said sections, whereby said weakened walls permit a controlled shrinkage of the bar while retaining substantially the initial cross-sectional shape of said sections, and trimming said cooled sections to a predetermined cross-sectional size and shape.

4. A method for preparing soap in cake form which comprises delivering a heated plastic mass of soap, simultaneously cooling and continuously forming said soap into a continuous substantially self-supporting bar having a substantially rectangular cross-section and a hardened surface zone, weakening the side walls of said bar, cooling said bar and thereafter allowing the residual heat of said bar to soften its surface zones to produce bars having a substanially uniform plasticity throughout and a cross-sectional shape substantially the same as that of said sections.

5. A method for preparing soap in cake form which comprises delivering a heated, plastic mass of soap, simultaneously cooling and forming said soap into a continuous bar having outwardly projecting ribs on opposite sides thereof and a narrow surface zone of less plasticity than the center of the bar, trimming said ribs from said bar to weaken the walls of the bar, separating said continuous bar into sections, and cooling said sections, said weakened walls permitting said sections to shrink while retaining substantially their initial cross-sectional shape.

6. A method for preparing soap in cake form which comprises delivering a heated, plastic mass of soap, simultaneously cooling and forming said soap into a continuous bar having outwardly projecting ribs on opposite sides thereof and a narrow surface zone of less plasticity than the center of the bar, trimming said ribs from said bar to weaken the walls of the bar and cooling sections of said bar, said weakened side walls permitting said sections to shrink while retaining substantially their initial cross-sectional shape, and trimming said sections to a predetermined cross-section.

7. A method for preparing soap in cake form which comprises delivering a heated, plastic mass of soap, simultaneously cooling and forming said soap into a continuous bar having outwardly projecting ribs on opposite sides thereof and a narrow surface zone of less plasticity than the center of the bar, trimming said ribs from said bar to weaken the walls of the bar, separating said continuous bar into sections, cooling sections of said bar and thereafter permitting the residual heat of said sections to warm the surface zones of said sections to render them of substantially uniform plasticity throughout, said weakened side walls permitting said sections to shrink while retaining substantially their initial cross-sectional shape.

8. A method for preparing soap in cake form which comprises delivering an aerated, heated, plastic mass of low-moisture content soap, simultaneously cooling and forming said soap into a continuous substantially rectangular bar having outwardly projecting ribs on opposite sides thereof, and a thin surface zone of less plasticity than the interior of the bar, trimming said ribs from said bar to weaken the walls of the bar, cooling sections of said bar and increasing the temperature of the surface zones of said sections to render them of substantially uniform plasticity throughout, said weakened side walls permitting said sections to shrink while retaining substantially their initial cross-sectional shape.

9. A method for preparing soap in cake form which comprises delivering a heated plastic mass of soap, simultaneously cooling and forming said soap into a self-sustaining continuous bar, severing said bar into sections of a predetermined length, subjecting said sections to cooling and thereafter increasing the temperature of the surface zones of said sections to render said sections of substantially uniform hardness throughout, trimming said sections to a predetermined cross-sectional area and shape and cutting them into cakes.

10. A method for preparing soap in cake form which comprises delivering a heated plastic mass of aerated soap, simultaneously cooling and forming said soap into a self-sustaining continuous bar, severing said bar into sections of a predetermined length, subjecting said sections to cooling and thereafter increasing the temperature of the surface zones of said sections to render said sections of substantially uniform hardness throughout, trimming said sections to a predetermined cross-sectional area and shape and cutting them into cakes.

11. An apparatus for treating plastic material comprising means for delivering a column of plastic material, means for cooling and shaping said plastic material continuously into a bar having a surface zone of less plasticity than its interior, means for decreasing the thickness of the less plastic zones in the opposite side walls of said bar, means for cutting said bar into sections of predetermined length, and means for receiving said sections and subjecting them to successive cooling and temperature equalizing conditions to render their plasticity substantially uniform throughout.

12. An apparatus for treating soap comprising means for continuously delivering under pressure a column of heated, plastic soap, a chain molding device for receiving said soap and shaping it into a bar of generally rectangular cross-section having ribs projecting from opposite sides thereof, means for chilling said molding device to form a hardened surface zone on said bar, means for trimming said ribs from said bar after the formation of the hardened surface zone to weaken said opposite walls of said bar, and means for successively cooling and warming sections of said bar to cause said sections to shrink while retaining substantially their initial shape and to render their plasticity substantially uniform throughout.

13. An apparatus for continuously producing soap in bar form comprising means for continuously delivering a column of heated, plastic soap, a chain molding device for receiving said column of soap and shaping it into a bar of generally rectangular cross-section having ribs projecting from opposite sides thereof, means for chilling said molding device to form a hardened surface zone on said bar, means for trimming said ribs from said bar after the formation of the hardened surface zone to weaken said opposite walls of said bar, an endless conveyor for receiving a plurality of sections of said bar, a housing enclosing said conveyor having an inlet and an outlet for said sections, means for cooling said sections throughout a major portion of the extent of the conveyor between said inlet and said outlet, and means for warming the surface zones of said sections before they reach said outlet.

14. A method of converting a heated plastic mass of material into cakes which comprises the steps of molding said material into a bar, chilling said bar to render the surface thereof firmer than the center, trimming the bar to form localized areas of weakness in the firmer surface of the bar, thereafter further cooling the bar, whereby said areas of weakness permit a controlled shrinkage of the bar during cooling, and cutting the bar transversely into cakes.

FRED FORREST PEASE.